(12) United States Patent
Wada et al.

(10) Patent No.: US 11,775,981 B2
(45) Date of Patent: Oct. 3, 2023

(54) INFORMATION PROCESSING DEVICE, METHOD, AND MEDIUM

(71) Applicant: Rakuten Group, Inc., Tokyo (JP)

(72) Inventors: Kei Wada, Tokyo (JP); Hideki Akashika, Tokyo (JP); Akiyoshi Takasago, Tokyo (JP); Maki Shibuya, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 183 days.

(21) Appl. No.: 17/382,622

(22) Filed: Jul. 22, 2021

(65) Prior Publication Data

US 2022/0027911 A1 Jan. 27, 2022

(30) Foreign Application Priority Data

Jul. 22, 2020 (JP) .................. 2020-125365

(51) Int. Cl.
*G06Q 30/00* (2023.01)
*G06Q 20/40* (2012.01)
*G06Q 40/02* (2023.01)
*G06Q 30/0601* (2023.01)
*G06Q 20/42* (2012.01)
*G06Q 20/28* (2012.01)

(52) U.S. Cl.
CPC .......... *G06Q 20/407* (2013.01); *G06Q 20/42* (2013.01); *G06Q 30/0631* (2013.01); *G06Q 40/02* (2013.01); *G06Q 20/28* (2013.01)

(58) Field of Classification Search
CPC ............ G06Q 30/06–08; G06Q 20/42; G06Q 20/407; G06Q 20/28; G06Q 40/02
See application file for complete search history.

(56) References Cited

U.S. PATENT DOCUMENTS 8,788,281 B1 * 7/2014 Pletz .................. G16H 10/60
705/2
2015/0199743 A1 * 7/2015 Pinel .................. G06Q 30/0631
705/26.7

FOREIGN PATENT DOCUMENTS

JP 9-128602 A 5/1997

* cited by examiner

*Primary Examiner* — Ethan D Civan
(74) *Attorney, Agent, or Firm* — Sughrue Mion, PLLC

(57) ABSTRACT

An information processing device is provided with a payment data acquiring unit for acquiring, from a payment processing system, payment data relating to a completed payment, a reimbursement object identifying unit for identifying, out of the payment data that is acquired, object payment data relating to a payment that is an object of reimbursement, on the basis of the information that enables identifying of the payer and the information that enables identifying of the payee included in the payment data, and a calculating unit for calculating a volume of a reimbursement value used for the reimbursement, on the basis of the payment amount included in one or a plurality of pieces of the object payment data identified by the reimbursement object identifying unit, for each payer.

16 Claims, 10 Drawing Sheets

FIG.4

| PAYMENT ACCOUNT (ELECTRONIC MONEY ACCOUNT NO., ETC.) | PAYEE ID (ESTABLISHMENT ID, ETC.) | PAYMENT AMOUNT | PAYMENT DATE AND TIME |
|---|---|---|---|
| 1111 2323 4545 6767 | 123456 | 900 | 2020.7.10.22:10 |
| 1212 0001 0234 0567 | 789012 | 1,000 | 2020.7.11.9:14 |
| 1212 0002 6789 8765 | 334455 | 500 | 2020.7.11.9:50 |
| | | | | ature monetary amount is added to the card balance, and the subtracted monetary amount is cumulated in the supplementary monetary amount cumulation region (see Japanese Patent Application Publication No. H09-128602).

INFORMATION PROCESSING DEVICE, METHOD, AND MEDIUM

CROSS-REFERENCE TO RELATED APPLICATION(S)

This application claims priority to and the benefit of Japanese Patent Application No. 2020-125365, filed on Jul. 22, 2020, the disclosure of which is expressly incorporated herein by reference in its entirety for any purpose.

FIELD

The present disclosure relates to technology for carrying out reimbursement on the basis of payment amount.

BACKGROUND

There conventionally has been proposed technology in which a supplementary monetary amount cumulation region is provided in a storage unit of a prepaid card, in which every predetermined period, a supplementary monetary amount granted during that period is cumulated and this cumulated supplementary monetary amount is stored. Whenever a monetary amount is input at the time of the card being newly sold or updated, a supplementary monetary amount that is no more than this monetary amount and that is set in advance corresponding to this monetary amount is added to the cumulated supplementary monetary amount stored in the supplementary monetary amount cumulation region. When the results of adding by adding means is no more than a reference supplementary monetary amount set in advance, the supplementary monetary amount is added to the card balance, and the supplementary monetary amount is cumulated in the supplementary monetary amount cumulation region. When the results of adding exceed the reference supplementary monetary amount, a monetary amount obtained by subtracting the cumulated supplementary monetary amount from the reference supplementary monetary amount is added to the card balance, and the subtracted monetary amount is cumulated in the supplementary monetary amount cumulation region (see Japanese Patent Application Publication No. H09-128602).

SUMMARY

Conventionally, reimbursing at least part of a payment amount paid by a predetermined payer to the payer has been performed, such as meal assistance for employees and so forth.

However, such reimbursing processing is extremely troublesome for both the payer and the reimbursing side, and also there are many hinderances to automating part of the reimbursing processing by introducing an information processing system, such as the need to renovate an existing system, and so forth.

With the foregoing in view, it is an object of the present disclosure to provide, in a system for reimbursing at least part of a payment amount paid by a predetermined payer to the payer, improved convenience of use for the payer and/or the reimbursing side.

An example of the present disclosure is an information processing device, including: payment data acquiring means for acquiring, from a payment processing system, payment data relating to a completed payment, including information that enables identifying of a payer, information that enables identifying of a payee, and a payment amount; reimbursement object identifying means for identifying, out of the payment data that is acquired, object payment data relating to a payment that is an object of reimbursement, on the basis of the information that enables identifying of the payer and the information that enables identifying of the payee included in the payment data; and calculating means for calculating a volume of a reimbursement value used for the reimbursement, on the basis of the payment amount included in one or a plurality of pieces of the object payment data identified by the reimbursement object identifying means, for each payer.

The present disclosure can be comprehended as being a method executed by an information processing device, a system, or a computer, or as a program executed by a computer. The present disclosure can also be comprehended as being an arrangement where such a program is recorded in a recording medium that is readable by a computer or some other device, machine, or the like. The term "recording medium that is readable by a computer or the like" as used here is a recording medium where information such as data, programs, and so forth, is accumulated by electrical, magnetic, optical, mechanical, or chemical action, and can be read by a computer or the like thereby.

According to the present disclosure, in a system for reimbursing at least part of a payment amount paid by a predetermined payer to the payer, convenience of use can be improved for the payer and/or the reimbursing side.

BRIEF DESCRIPTION OF THE DRAWINGS

FIG. 4 is a diagram showing an example of information included in payment data according to the embodiment;

DESCRIPTION OF EMBODIMENTS

An embodiment of an information processing system, an information processing device, method, and program according to the present disclosure will be described below with reference to the Figures. Note however, that the description of the embodiment below is an exemplification of the embodiment, and does not limit the information processing system, information processing device, method, and program according to the present disclosure to the specific configurations described below. In implementation, specific configurations are employed as appropriate in accordance with the form of implementation, and various alterations and modifications may be made.

In the present embodiment, an arrangement will be described in which the information processing system, information processing device, method, and program according to the present disclosure have been carried out in a supplementary reimbursing system for providing benefits to employees and so forth of a corporation, in which in a case of a payer who is an employee or the like makes payment for meal charges in an object establishment, this corporation or the like supplements at least part of this payment. Note however, that the information processing system, information processing device, method, and program according to the present disclosure is capable of being broadly used in technology for carrying out reimbursement based on a payment amount, such as supplementing, settling costs, and so forth, not limited to meal charges, and the object of application of the present disclosure is not limited to the example shown in the present embodiment.

System Configuration

Figure 1:
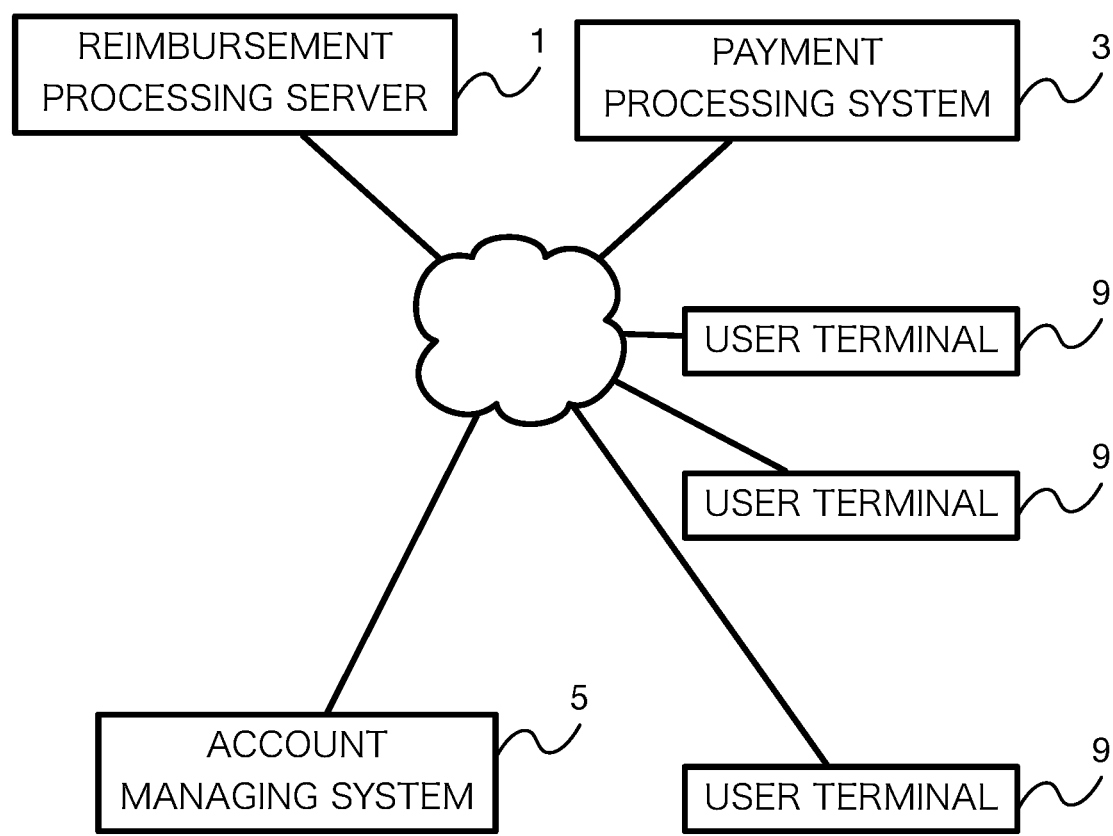
FIG. 1 is a schematic diagram illustrating a configuration of an information processing system according to an embodiment.

FIG. 1 is a schematic diagram illustrating a system configuration according to the present embodiment. The system according to the present embodiment is provided with a reimbursing processing server 1, a payment processing system 3, an account managing system 5, and one or a plurality of user terminals 9, which are capable of communication with each other, by being connected to a network.

Figure 2:
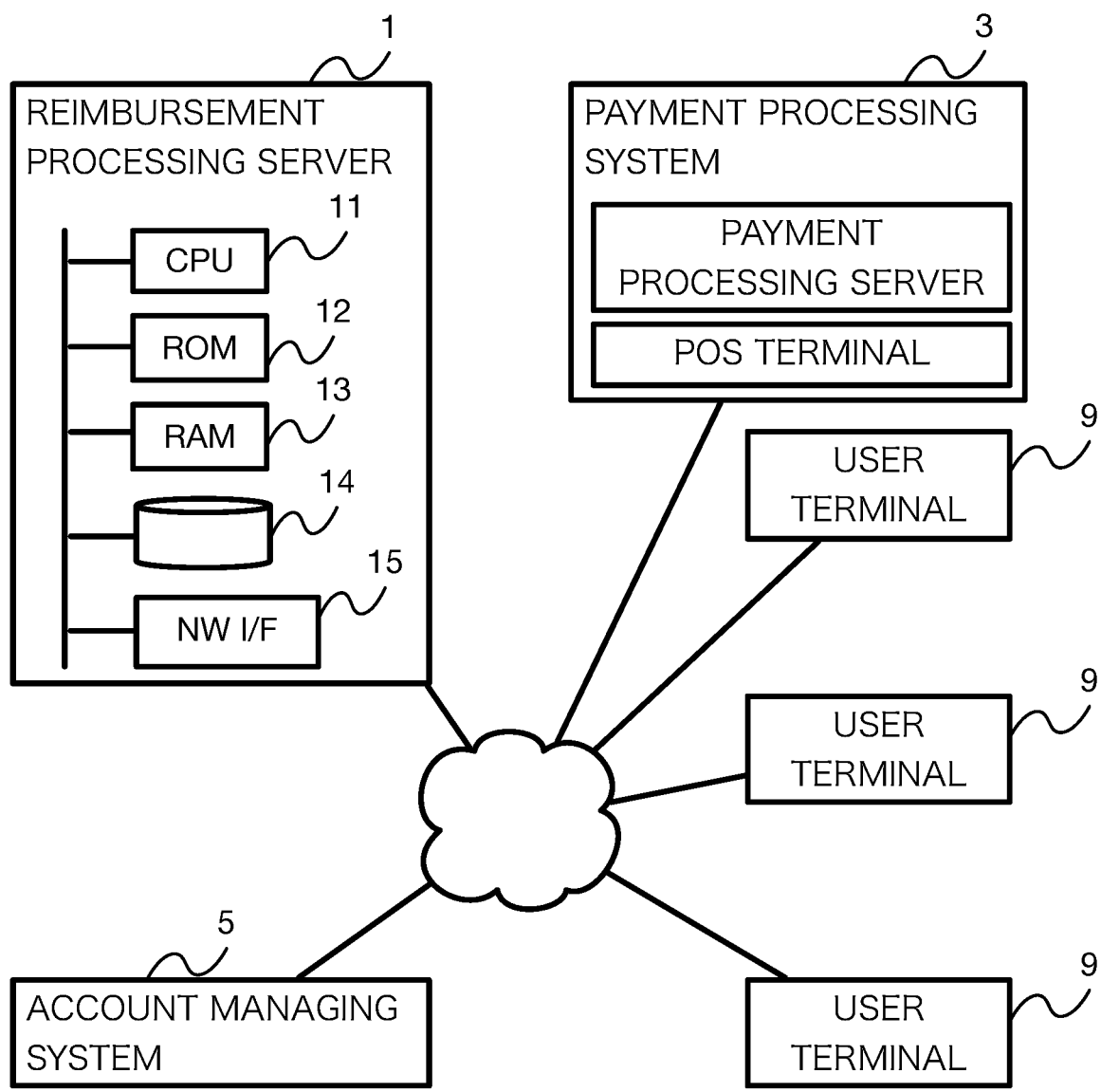
FIG. 2 is a diagram illustrating a schematic hardware configuration of the information processing system according to the embodiment.

FIG. 2 is a diagram illustrating a schematic hardware configuration of the system according to the present embodiment. The reimbursing processing server 1 is a server for providing users with point services. The reimbursing processing server 1 is a computer that is provided with a central processing unit (CPU) 11, read-only memory (ROM) 12, random access memory (RAM) 13, a storage device 14 such as electrically erasable and programmable read-only memory (EEPROM) or a hard disk drive (HDD) or the like, a communication unit 15 such as a network interface card (NIC) or the like, and so forth. Note however, that specific hardware configurations of the reimbursing processing server 1 may be omitted, replaced, or added as appropriate in accordance with the form of implementation. Further, the reimbursing processing server 1 is not limited to a device with a single housing. The reimbursing processing server 1 may be realized by a plurality of devices, using technology of the so-called cloud or distributed computing, or the like.

The payment processing system 3 is a system for providing payment (settlement) using electronic money, points, credit, and so forth, to users. The payment processing system 3 is a system including a payment processing server that is provided with a CPU, ROM, RAM, a storage device, a communication unit, and so forth (omitted from illustration), and a point of sales (POS) terminal. Note however, that specific configurations of the payment processing system 3 may be omitted, replaced, or added as appropriate in accordance with the form of implementation. Also, the payment processing system 3 may be realized by a plurality of devices, using technology of the so-called cloud or distributed computing, or the like.

The account managing system 5 is a system for managing accounts of users. The accounts managed here are accounts for managing values such as electronic money, points, credit, and so forth, possessed by users. Note that the type of electronic money used in the present embodiment is not limited. For example, the electronic money may be so-called server-type electronic money of which the balance is stored in a server, or may be so-called integrated circuit (IC)-type electronic money of which the balance is recorded in an IC. The account managing system 5 is a system that is provided with a CPU, ROM, RAM, a storage device, a communication unit, and so forth (omitted from illustration). Note however, that specific configurations of the account managing system 5 may be omitted, replaced, or added as appropriate in accordance with the form of implementation. Also, the account managing system 5 may be realized by a plurality of devices, using technology of the so-called cloud or distributed computing, or the like.

The user terminal 9 is a terminal device used by a user. The user terminal 9 is a computer that is provided with a CPU, ROM, RAM, a storage device, a communication unit, an input device, an output device, and so forth (omitted from illustration). Also, the user terminal 9 is not limited to a device with a single housing. The user terminal 9 may be realized by a plurality of devices, using technology of the so-called cloud or distributed computing, or the like. The user uses various types of services provided by the reimbursing processing server 1 and the payment processing system 3 via such user terminals 9.

Figure 3:
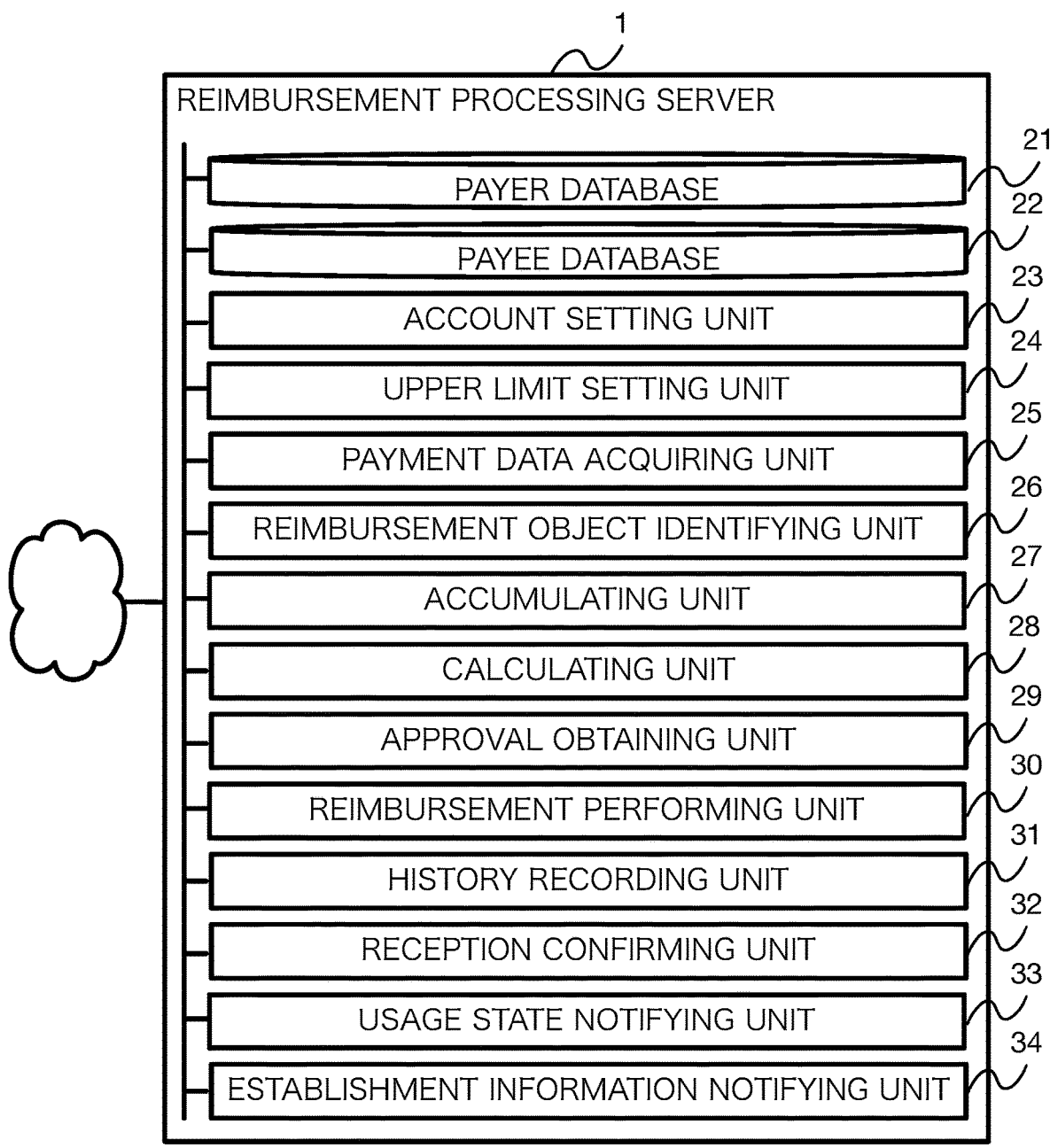
FIG. 3 is a diagram illustrating a schematic functional configuration of a reimbursing processing server according to the embodiment.

FIG. 3 is a diagram illustrating a schematic functional configuration of the reimbursing processing server 1 according to the present embodiment. The reimbursing processing server 1 functions as an information processing device that is provided with a payer database 21, a payee database 22, an account setting unit 23, an upper limit setting unit 24, a payment data acquiring unit 25, a reimbursement object identifying unit 26, an accumulating unit 27, a calculating unit 28, an approval obtaining unit 29, a reimbursement performing unit 30, a history recording unit 31, a reception confirming unit 32, a usage state notifying unit 33, and an establishment information notifying unit 34, by programs recorded in the storage device 14 being read out to the RAM 13, and executed by the CPU 11, thereby controlling each of the pieces of hardware that the reimbursing processing server 1 is provided with. Note that while the functions that the reimbursing processing server 1 is provided with are executed by the CPU 11 that is a general-purpose processor in the present embodiments and later-described other embodiments, part or all of these functions may be executed by one or a plurality of dedicated processors.

The payer database 21 is a database of managing payers (in the present embodiment, employees of a corporation that performs meal assistance) who are the objects of reimbursing by the supplementary reimbursing system according to the present embodiment, and accumulates, for each payer (user), a payer ID, an affiliated group ID (corporate ID), a payment account (electronic money account No., etc.), a receiving account (electronic money account No., etc.), an upper limit for reimbursing, usage state data (reimbursed amount), reimbursing history, a visited establishment list, a campaign achievement state, and other such information. Note however, that the form of managing information regarding payers is not limited to the exemplification in the present embodiment. For example, the usage state data (reimbursed amount), reimbursing history, visited establishment list, and campaign achievement state may be managed in a different database from the payer database 21, in a manner associated with the payer ID.

The payee database 22 is a database for the supplementary reimbursing system according to the present embodiment to manage payees that are the object of reimbursing (in the present embodiment, food establishments such as eateries and/or shops specified by the corporation that performs meal assistance), and accumulates, for each establishment, payee ID (establishment ID), name of establishment, geographical information, campaign participation information, specifying corporation information (corporate ID of corporation specifying the payee as the object of reimbursing, etc.), and other information.

The account setting unit 23 associates an account, specified as payment means to be used for payment that is the object of reimbursing, with the payer, as a payment account, associates an account, specified as receiving means to be used for receiving the reimbursed value, with the payer, as a receiving account, and registers these accounts in the payer database 21. Different accounts for the same payer (user) may be specified for the payment account and the receiving account.

It is sufficient for the receiving account to be an account capable of receiving later-described reimbursement values, and the type of account that can be associated as a receiving account is not limited. Various types of accounts, such as electronic money accounts, point accounts, bank accounts, and so forth, may be capable of being associated as receiving accounts. Note that the account setting unit 23 may associate, with the payer, the same account as the payment account registered to be used for payment by the payer as the receiving account. Thus, reimbursement can be performed to the account that the payer has used for payment, and convenience can be improved.

Also, an account of the payer may be associated with the receiving account, or an account of a different person may be associated therewith. That is to say, the receiving account may be an account of a proxy user who is different from the payer him/herself. Examples of proxy users here include the corporation hiring the payer, a benefits outsourcer, and so forth. More specifically, the following accounts may be specified as the receiving account.

(1) Account of Payer Himself/Herself

The reimbursement amount can be directly received by the payer by setting an account of the payer him/herself (e.g., an electronic money account to which values for payment by a prepaid system can be added to the balance), as the receiving account. Further, by arranging for the receiving account to be the same account as the payment account for payment of the object of reimbursement, the reimbursement amount can be reimbursed to the account that the payer uses for payment, thereby improving convenience. Note that although an electronic money account is exemplified in the present embodiment as the receiving account of the payer, the receiving account is not limited to an electronic money account, and may be any account that is capable of receiving reimbursed values. The receiving account may be a point account, a bank account, or the like, for example.

(2) Account of Group with which Payer is Affiliated

An account of a group with which the payer is affiliated (e.g., the corporation at which the payer works, etc.) may be set as the receiving account. For example, in a case in which the group with which the payer is affiliated employs an arrangement in which the reimbursement amount is imparted to the payer, the reimbursement amount is reimbursed to the group. Note that impartation from the group to the account of the payer may be performed by charging to a payment account at a start point in time of an object period, or may be imparting to a receiving account after an object period has elapsed. Also, the imparting means may be any arrangement.

(3) Account of Other Group

An account of another group may be set as the receiving account. Examples of such a group include a business that acts as an agent carrying out benefits services of the corporation at which the payer works (hereinafter referred to as "benefits outsourcer"), or the like. In a case in which benefits services of the corporation at which the payer works are outsourced to the benefits outsourcer, and the benefits of the payer are managed by benefits points (so-called cafeteria points), the payer can specify reimbursement by the supplementary reimbursement system according to the present embodiment as where to use the benefits points in advance, and specify the number of benefits points to be applied to reimbursement, thereby specifying a reimbursement upper limit for an object period. The benefits outsourcer that has received the specification of the number of benefits points secures the specified benefits points as points to be used for reimbursement in the supplementary reimbursement system according to the present embodiment (deposited value). After the object period elapses, the reimbursement amount is imparted to the account of the benefits outsourcer. Note that in a case in which there are unused points in the secured benefits points (deposited value) due to the reimbursement amount not reaching the reimbursement upper limit, the benefits outsourcer may return the unused benefits points to the benefits point account of the payer.

The upper limit setting unit 24 sets the upper limit of the volume (reimbursement amount) of reimbursement value calculated in accordance with the payment value to the payer database 21. Note that in the present embodiment, a value decided by the payer, or alternatively by the above-described proxy user, may be set to the reimbursement upper limit. Also, a value decided in accordance with the volume of the deposited value that the payer has deposited with the proxy user (the secured benefits points in the example described above), for example, may be set to the reimbursement upper limit. The reimbursement upper limit is decided in accordance with the volume of the deposited value in the above description, but in a case in which the volume of the reimbursement value imparted to the receiving account by the reimbursement performing unit 30 does not reach the upper limit, deposited value equivalent to the different may be returned to the payer.

Note that the reimbursement upper limit may be set to a different value each object period. Enabling the reimbursement upper limit to be variable among each object period enables flexible handling of desires of the payer him/herself who is an employee, difference in accordance with service years, changes occurring due to transfer during an object period, difference in accordance with employment structure, and so forth. Also, operation may be carried out with a usage percentage as to the reimbursement upper limit (reimbursed amount/reimbursement upper limit) being automatically calculated each object period (e.g., monthly), for each reimbursement object (payer), and the reimbursement upper limit set for the next object period being automatically change in accordance with the calculated usage percentage (e.g., raising the reimbursement upper limit in a case of the usage percentage exceeding a predetermined reference, and lowering the reimbursement upper limit in a case of the usage percentage not reaching the predetermined reference).

The payment data acquiring unit 25 acquires, from the payment processing system 3, payment data regarding completed payments, including information by which the payer can be identified (e.g., electronic money account No. of payer), information by which the payee can be identified (e.g., establishment ID), and amount of payment.

FIG. 4 is a diagram illustrating an example of information included in payment data according to the present embodiment. The payment data according to the present embodiment includes payment account (electronic money account No., etc.), payee ID (establishment ID, etc.), payment amount, and payment date and time. In the present embodiment, whether or not certain payment data is payment data that is within an object period is determined on the basis of the payment date and time in the payment data. According to the payment data, the payment means of the payer can be identified by referencing the payment account (electronic money account No., etc.), for example.

The reimbursing object identifying unit 26 identifies object payment data relating to payments that are the object of predetermined reimbursement out of the acquired payment data, on the basis of information regarding which the payer included in the payment data can be identified and information regarding which the payee can be identified. In the present embodiment, the reimbursing object identifying unit 26 searches the payer database 21 on the basis of the payment account (electronic money account No., etc.) included in the payment data, searches the payee database 22 on the basis of a payee ID (establishment ID, etc.) regarding which the identified payer is determined to be affiliated with a predetermined group (organization such as a corporation or the like), and is included in the payment data, and in a case of determining that this payee is a payee that is the object of supplementary reimbursement, identifies this payment data as object payment data. Note that in a case in which specifying corporation information (corporation ID or the like of the corporation specifying the payee as the reimbursement object) is set in the payee database 22, the reimbursing object identifying unit 26 can also determine whether or not the corporation identified by the affiliated group ID of the payer is included in the specifying corporation information set for the payee, thereby identifying object payment data relating to payments that are the object of reimbursement.

The accumulating unit 27 accumulates at least data identified by the reimbursing object identifying unit 26 as being object payment data. Accumulating object payment data in this way enables batch processing for carrying out reimbursement. Note that in the present embodiment, an example will be described in which prior to accumulation by the accumulating unit 27, object payment data is identified by the reimbursing object identifying unit 26 each time payment data is acquired by the payment data acquiring unit 25, but the timing of the reimbursing object identifying unit 26 identifying the object payment data is not limited to the example described in the present embodiment. For example, the reimbursing object identifying unit 26 may read out payment data that has already be accumulated, perform batch processing (daily, weekly, monthly, etc.), and identify object payment data all at once.

The calculating unit 28 calculates the amount of the reimbursement value used for a predetermined reimbursement, on the basis of payment amounts included in one or a plurality of pieces of object payment data identified by the reimbursing object identifying unit 26, for each payer. In the present embodiment, the calculating unit 28 calculates the volume of the reimbursement value for object payment data within a predetermined period that has been read from the accumulating unit 27, on the basis of payment amount included in the object payment data, a reimbursement percentage set in advance, and a reimbursement upper limit set in advance for each payer.

Specifically, in the present embodiment, the calculating unit 28 multiples the cumulative sum of payment amounts included in object payment data within the object period by the reimbursement percentage (e.g., 50%), and in a case in which the calculated amount does not exceed the reimbursement upper limit (e.g., 3,500 Yen per month), takes the calculated amount to be the reimbursement amount (volume of reimbursement value). Note that in a case in which the calculated amount exceeds the reimbursement upper limit, the calculating unit 28 takes the reimbursement upper limit to be the reimbursement amount. Note however, that the method of calculating the amount of reimbursement value disclosed in the present embodiment is one example, and the amount of reimbursement value may be calculated according to other calculation methods or standards.

The approval obtaining unit 29 outputs itemized data including the volume of reimbursement value calculated by the calculating unit 28 regarding a predetermined object period, for each payer, or for each group with which the payer is affiliated, and seeks approval from an administrator. The approval obtaining unit 29 then accepts input of the approval from the administrator. Upon approval being acquired by the approval obtaining unit 29, the reimbursement performing unit 30 carries out the predetermined reimbursement regarding the payer or the group.

The reimbursement performing unit 30 carries out predetermined reimbursement by imparting the reimbursement value of the volume relating to the payer calculated by the calculating unit 28, to the receiving account associated with the payer, identified on the basis of the object payment data. Note that the type of reimbursement value to be imparted is not limited. The reimbursement value may be electronic money or may be points. Also, although the reimbursement value may be directly added to the balance of the receiving account without going through user operations of the receiving account, the reimbursement value is not limited to being directly added to the balance of the receiving account. In the present embodiment, an example of a type of reimbursement value that is added to the balance of the account of a user through a receiving operation performed by the user of the receiving account (hereinafter referred to as "electronic gift"), being imparted to the receiving account by the reimbursement performing unit 30, will be described. The user may also be able to specify which account to add the value specified in the electronic gift to the balance, and may be able to convert the electronic gift into a type of value (electronic money, points, etc.) that the user desires. Also, in a case in which the reimbursement that is carried out is supplementation provided to the payer by a group (corporation) with which the payer is affiliated, the corporation that provides the service carried out by the reimbursing processing server 1 bills this group (corporation) or proxy user (benefits outsourcer) or the like for the reimbursement value (reimbursement amount) regarding which reimbursement is carried out.

The history recording unit 31 records the reimbursement history of the reimbursement value by the reimbursement performing unit 30. Further, in the present embodiment, the history recording unit 31 updates the reimbursement history on the basis of data acquired by the reception confirming unit 32, thereby updating the state of receiving reimbursement value already imparted.

The reception confirming unit 32 confirms that the reimbursement value already imparted has been added to the balance in the account of the user, by acquiring data that enables confirmation of a reception operation that has been performed by the user of the receiving account.

The usage state notifying unit 33 transmits the volume of the reimbursement value calculated by the calculating unit 28, and notification data by which the reimbursement upper limit value set in advance for each payer can be comprehended, to the user terminal 9 of the payer.

The establishment information notifying unit 34 extracts one or a plurality of recommended establishments satisfying predetermined conditions, from the payee database 22 for identifying payees, and transmits information relating to the recommended establishments that have been extracted (name of establishment, geographical information, information such as participation in campaigns, etc.) to the user terminal 9 of the payer. Predetermined conditions here are, for example, conditions such as the location of the establishment indicated by the geographical information being within a predetermined range from the workplace of the user, the establishment participating in a predetermined campaign such as a limited-time campaign during which points are imparted to a special loyalty card, and so forth. The establishment information notifying unit 34 also compares one or a plurality of recommended establishments extracted according to predetermined conditions with payees identified by payment data relating to the payer, thereby extracting unvisited establishments that are recommended establishments at which the payer has not performed payment (has not visited), and transmits information relating to the one or a plurality of extracted unvisited establishments to the user terminal 9 of the payer.

Flow of Processing

Next, a flow of processing carried out by the information processing system according to the present embodiment will be described. Note that the specific contents of processing and the processing order thereof described below are one example of carrying out the present disclosure. Specific processing contents and the order of processing may be selected as appropriate in accordance with the embodiment of the present disclosure.

Figure 5:
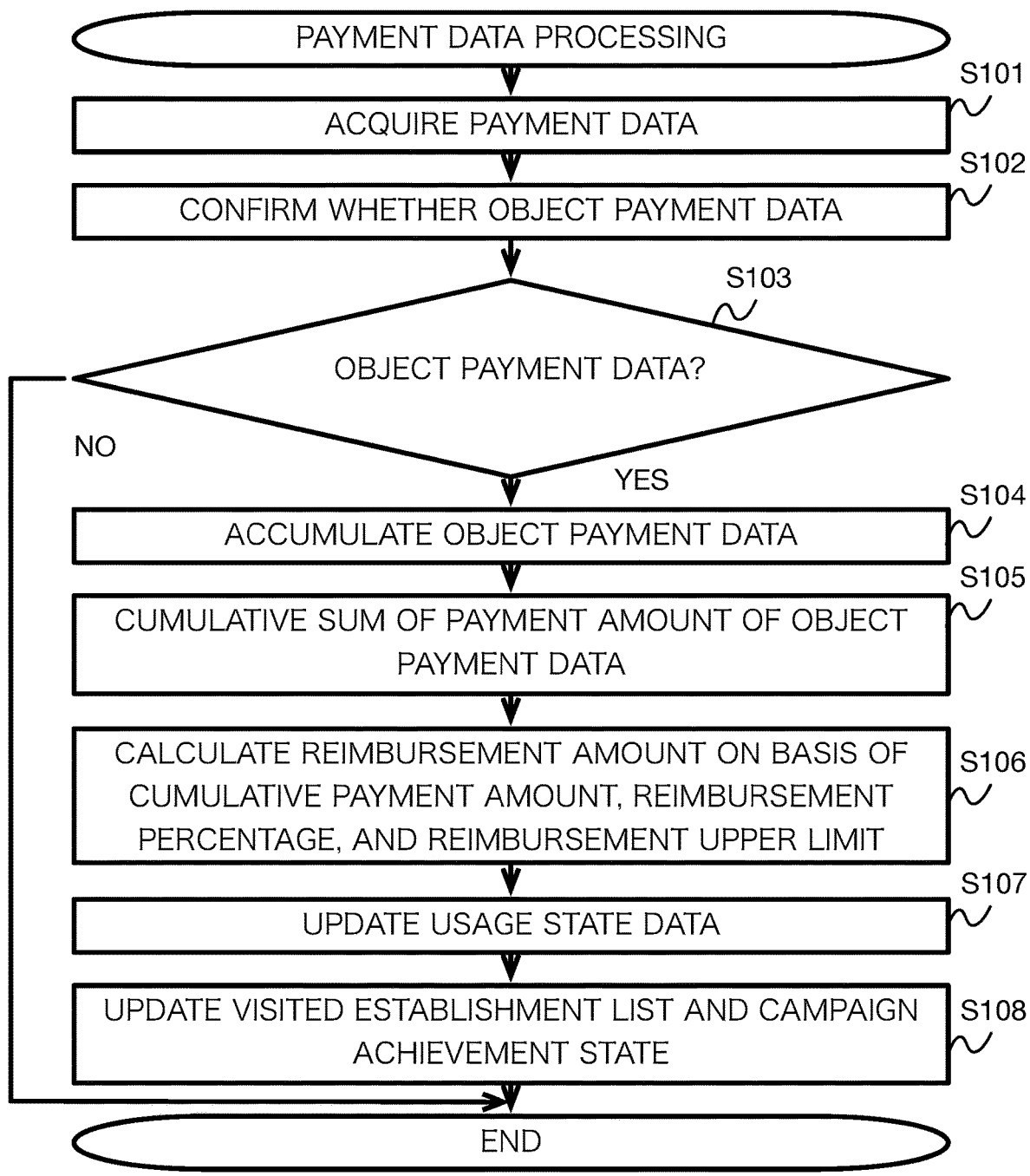
FIG. 5 is a flowchart showing an overview of payment data processing according to the embodiment.

FIG. 5 is a flowchart showing an overview of payment data processing according to the present embodiment. The processing shown in this flowchart is carried out, triggered by reception of payment data regarding a completed payment from the payment processing system 3. However, the timing at which the processing shown in this flowchart is executed is not limited to the example described here. For example, the payment data processing may be periodically carried out at a timing set in advance.

In steps S101 through S104, determination is made regarding whether or not received payment data is object payment data that is the object of reimbursement. The payment data acquiring unit 25 acquires payment data regarding the completed payment from a payment processing system that is capable of processing payment by electronic money of a predetermined type (step S101), for example. This payment data here includes information by which the payer can be identified, information by which the payee can be identified, and the payment amount, as described earlier.

Once the payment data is acquired, the reimbursing object identifying unit 26 compares the information by which the payer can be identified (electronic money account No. in the present embodiment) and the information by which the payee can be identified (the payee ID in the present embodiment) included in the payment data, with electronic money account Nos. registered in advance in the payer database 21 as being reimbursement objects and payee IDs registered in advance in the payee database 22 as being objects of reimbursement, and determines whether or not a matching payer and payee are registered (step S102), thereby determining whether or not this payment data is payment data that is the object of reimbursement (object payment data) (step S103). In a case of determining that the payment data acquired in step S101 is not object payment data (NO in step S103), the processing shown in steps S104 through S108 is skipped, and the processing shown in this flowchart ends. Conversely, in a case of determining that the payment data acquired in step S101 is object payment data (YES in step S103), the accumulating unit 27 accumulates the identified object payment data in the storage device 14 (step S104). Thereafter the processing advances to step S105.

In steps S105 and S106, the reimbursement amount at the current point in time is calculated. The calculating unit 28 calculates the cumulative sum of payment amounts included in object payment data accumulated so far during the current object period (e.g., the object month) (step S105), and calculates the volume of the reimbursement value (note however, the volume at the point in time of calculating) to be reimbursement regarding the payment of the object period, in accordance with the calculated cumulative payment amount, the reimbursement percentage set in advance, and the reimbursement upper limit set in advance for each payer (step S106). A specific calculation method has been described above in description of the calculating unit 28, and accordingly description will be omitted here. Note that in the present embodiment, description will be made regarding an example in which the reimbursement is reimbursed as an electronic gift that is exchangeable with electronic money, and accordingly, the volume of the reimbursement value will be described as being a "reimbursement amount" hereinafter. Note however, that the type of the value reimbursed is not limited to the electronic gift exemplified in the present embodiment. Various types of values, such as electronic money, points, and so forth, may be used for the reimbursement value.

In steps S107 and S108, the usage state of the reimbursement object service is updated. When the reimbursement amount is calculated, the payer database 21 records the calculated reimbursement amount as the reimbursement amount for the object period at the present point in time, thereby updating the usage state data of the payer (step S107). Further, the payer database 21 updates the visited establishment list and campaign achievement state regarding the object payer in the payer database 21, on the basis of object payment data used for calculating the reimbursement amount (step S108). Specifically, the payer database 21 adds establishments identified on the basis of payee IDs shown in the object payment data to the visited establishment list of the object payer. Further, in a case in which the establishment is an object of a limited-time campaign during which points are imparted to a special loyalty card, or the like, the payer database 21 adds the establishment to the campaign achievement state of the object payer. At this point in time, the processing shown in this flowchart ends.

Figure 6:
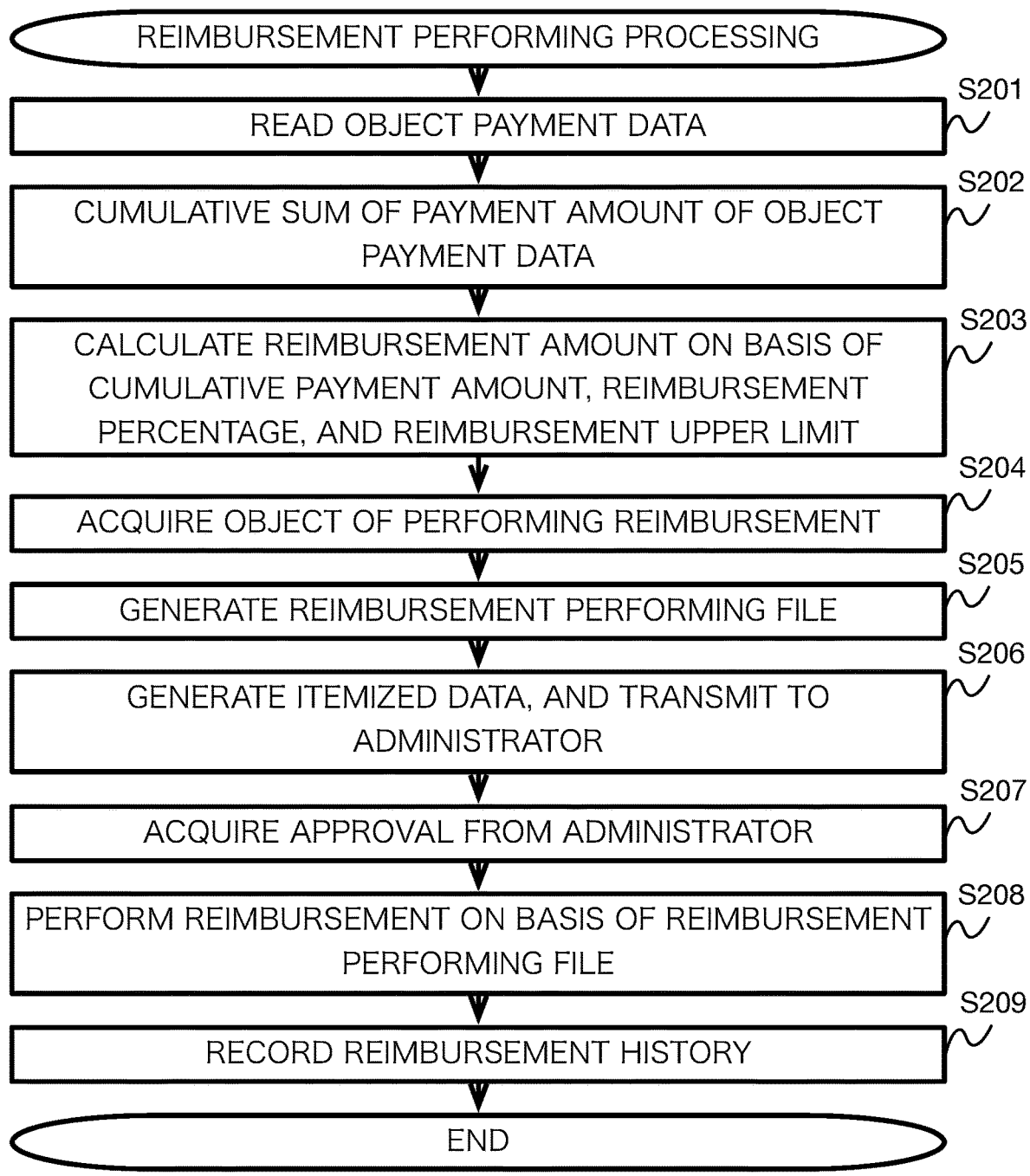
FIG. 6 is a flowchart showing an overview of reimbursement performing processing according to the embodiment.

FIG. 6 is a flowchart showing an overview of reimbursement performing processing according to the present embodiment. The processing shown in this flowchart is carried out for each object group following the object period (e.g., object month) ending. Note however, that the timing and object of performing the processing shown in this flowchart are not limited to the example described here. For example, the reimbursement performing processing may be carried out for each object payer.

In steps S201 through S203, the reimbursement amount for the object period is calculated. The calculating unit 28 reads all object payment data accumulated in the object period (e.g., object month) that has ended, for the group that is the object of processing (step S201), and calculates the cumulative sum of the payment amount included in one or a plurality of pieces of read object payment data, for each payer (Step S202). The calculating unit 28 then calculates the volume of the reimbursement value (reimbursement amount) to be reimbursed of payments made in the object period, in accordance with the cumulative payment amount calculated for each payer, the reimbursement percentage set in advance, and the reimbursement upper limit set in advance for each payer (step S203). The calculating unit 28 performs calculation of the cumulative sum and calculation of the reimbursement amount here, for each of all payers affiliated with the object group. A specific calculation method for calculating the volume of the reimbursement value has been described above in the description of the calculating unit 28, and accordingly description will be omitted here. Thereafter, the processing advances to step S204.

In steps S204 through S209, reimbursement is carried out. The reimbursement performing unit 30 acquires the receiving account of the object of performing reimbursement that is associated with the payer affiliated with the object group, regarding which the reimbursement amount is calculated in step S203, by referencing the payer database 21 (step S204). The receiving account may be an account of the payer him/herself, or may be an account of another person, as described earlier. Upon the receiving account being acquired, the reimbursement performing unit 30 generates a reimbursement performing file that includes the reimbursement amount calculated for each payer in step S203, and the receiving account of the payer (step S205).

Also, the approval obtaining unit 29 generates itemized data including the payer that is affiliated with the object group and is the object of reimbursement, the receiving account of the payer, and the reimbursement amount for each payer, and transmits this itemized data to a predetermined administrator (S206). The administrator here is a person designated to handle the processing object group (benefits manager or accountant) or the like, for example. Accordingly, the itemized data may further include information enabling comprehending of the payee for each payment, amount of payment, and date and time of payment acquired on the basis of the object payment data, so that the purpose of each payment amount can be confirmed. The administrator confirms the content of the received itemized data, and if there is no problem, performs input to the reimbursing processing server 1 to the effect of approving the itemized data. The approval obtaining unit 29 acquires the approval input by the administrator (step S207).

Upon approval by the administrator being obtained, the reimbursement performing unit 30 references the reimbursement performing file generated in step S205, and carries out reimbursement regarding the payer affiliated with the object group (step S208). Specifically, the reimbursement performing unit 30 carries out reimbursement by imparting the reimbursement amount relating to the payer to the receiving account corresponding to this payer. The payer and administrator are also notified to the effect that the reimbursement has been carried out.

In a case in which the receiving account is an electronic money account of the payer, an electronic gift is imparted to the receiving account in the present embodiment, as described above. In a case in which reimbursement is carried out by impartation of the electronic gift, the history recording unit 31 records reimbursement history including information by which the imparted electronic gift and the receiving account to which this electronic gift has been imparted can be identified (e.g., electronic gift ID and electronic money account No.) in the payer database 21 (step S209). Thereafter, the processing shown in this flowchart ends.

The user who has received impartation of the electronic gift equivalent to the reimbursement amount adds the value relating to this electronic gift to the balance in the electronic money account of the user as electronic money, by performing a receiving operation for the electronic gift at the user terminal 9 such as a smartphone or the like that executes an electronic money management application, or a kiosk terminal or the like. The account managing system 5 performs receiving processing of the electronic gift by adding electronic money that is equivalent to the volume of the value indicated by the electronic gift relating to the receiving operation, to the balance in the specified account, and setting the electronic gift to a received status. The account managing system 5 also notifies the reimbursing processing server 1 that the receiving operation of the electronic gift has been performed and that the value relating to the electronic gift has been added to the electronic money account of the user (electronic gift reception notification). Now, the electronic gift reception notification includes, for example, an identifier of the received electronic gift (electronic gift ID) and an identifier of the electronic money account to which the balance is added (electronic money account No.).

Figure 7:
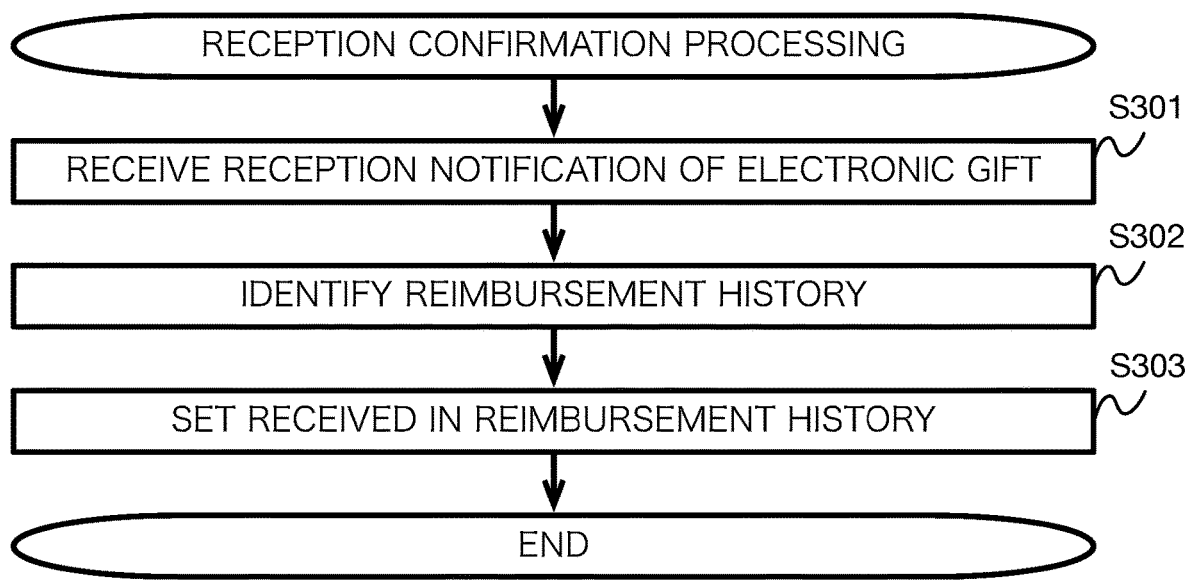
FIG. 7 is a flowchart showing an overview of reception confirmation processing according to the embodiment.

FIG. 7 is a flowchart showing an overview of reception confirmation processing according to the present embodiment. The processing shown in this flowchart is carried out, triggered by receiving the electronic gift reception notification from the account managing system 5.

Upon the electronic gift reception notification being received (step S301), the reception confirming unit 32 identifies the reimbursement history recorded in the payer database 21, in accordance with the electronic gift ID and/or electronic money account No. included in the reception notification (step S302), and the history recording unit 31 sets reimbursement history that has been identified (received) to a received status (step S303). Setting to the received status can be performed using a flag, for example. Note however, the method of recording the reception state of the electronic gift is not limited to the exemplification of the present embodiment. Thereafter, the processing shown in this flowchart ends.

According to the processing shown in this flowchart, the party carrying out supplementation, such as a corporation or the like, can comprehend the state of whether or not the supplementation has been actually received by the payer, and use this knowledge to study the supplementation system and reimbursement percentages.

Figure 8:
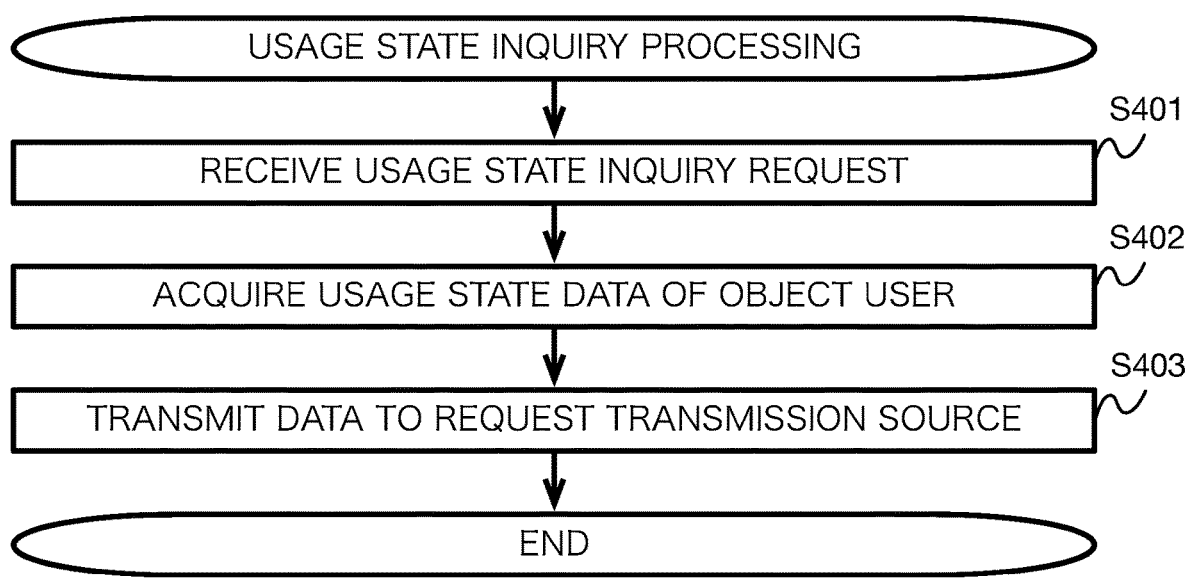
FIG. 8 is a flowchart showing an overview of usage state inquiry processing according to the embodiment.

FIG. 8 is a flowchart illustrating an overview of usage state inquiry processing according to the present embodiment. The processing shown in this flowchart is carried out triggered by receiving a usage state inquiry request including information capable of identifying an object payer (e.g., payer ID) and information indicating an inquiry object period, transmitted by the user terminal 9 (smartphone, etc.) executing an application to use the supplementary reimbursement according to the present embodiment.

Upon receiving a usage state inquiry request from the user terminal 9 (step S401), the usage state notifying unit 33 identifies the payer relating to the request, and acquires usage state data of the object payer that has been identified, from the payer database 21 (step S402, see step S107 for updating of usage state data). The usage state notifying unit 33 then acquires usage state data relating to the inquiry object period (may be the current object period, or may be a past object period) in accordance with the inquiry object period specified in the usage state inquiry request. The usage state notifying unit 33 transmits the acquired usage state data, or display data generated on the basis of the acquired usage state data, to the terminal that is the transmission source of the request (step S403). The user terminal 9 that has received the usage state data or the display data displays a usage state notification screen on the basis of the received data. Thereafter, the processing shown in this flowchart ends.

Figure 9:
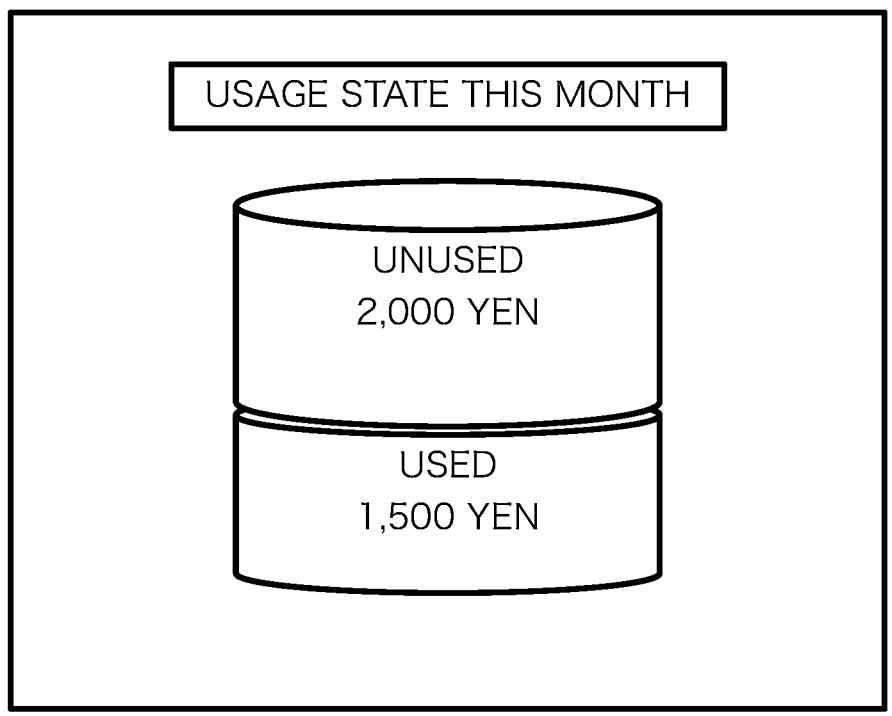
FIG. 9 is a diagram illustrating an example of a usage state notification screen displayed on a user terminal in the embodiment.

FIG. 9 is a diagram illustrating an example of a usage state notification screen displayed on the user terminal 9 in the present embodiment. The usage state notification screen includes information by which the usage state in the inquiry object period can be comprehended. In the example illustrated in FIG. 9, an amount corresponding to "reimbursement upper limit minus reimbursement amount" is shown for "unused", and an amount corresponding to "reimbursement amount" is shown for "used" (note that the reimbursement amount is that at the current point in time, since the display is for "usage state this month"). By displaying such a screen in response to a request, the user can comprehend the usage state at the current point in time (point in time of accepting request) and/or in a past object period. Note that the information notified and displayed is not limited to the combination of "reimbursement upper limit minus reimbursement amount" and "reimbursement amount" illustrated in FIG. 9, and may be any information that enables the user to comprehend the reimbursement amount and reimbursement upper limit. For example, the user will be able to comprehend the reimbursement amount and the reimbursement upper limit by a combination of "reimbursement amount" and "reimbursement upper limit" or a combination of "reimbursement upper limit" and "reimbursement upper limit minus reimbursement amount" as well.

Figure 10:
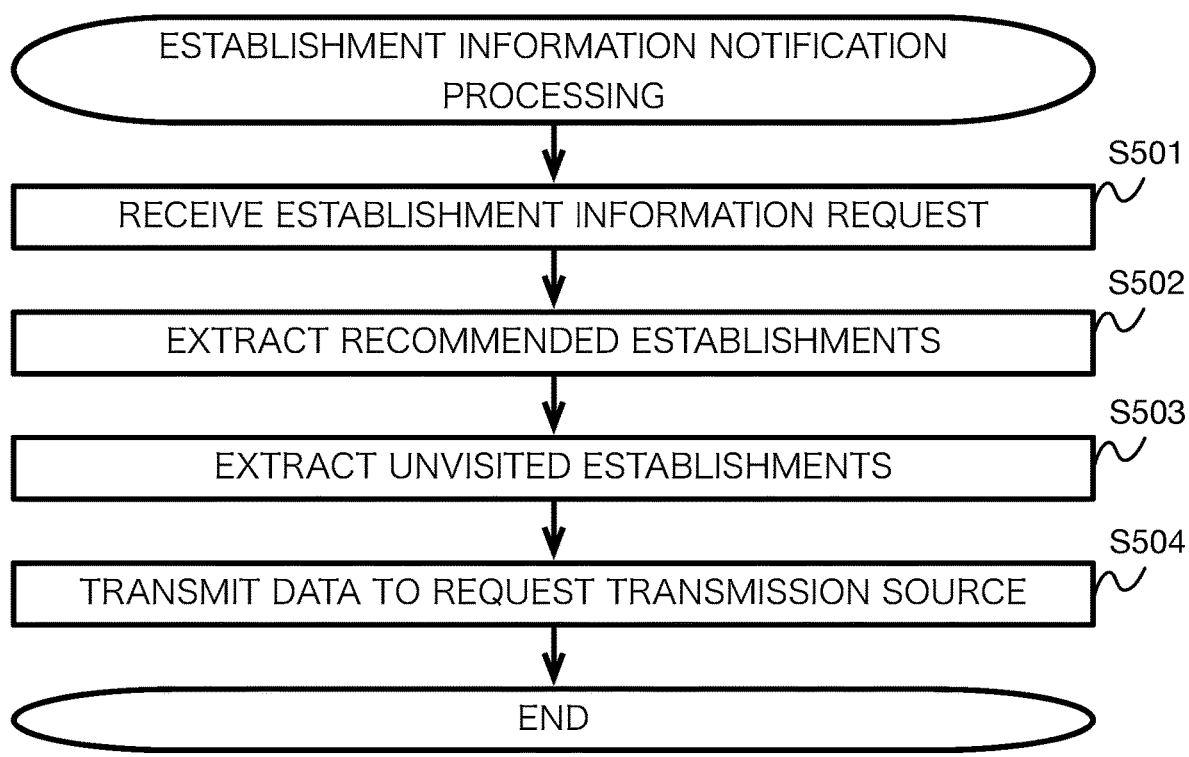
FIG. 10 is a flowchart showing an overview of establishment information notification processing according to the embodiment.

FIG. 10 is a flowchart showing an overview of establishment information notification processing according to the present embodiment. The processing shown in this flowchart is carried out triggered by receiving an establishment information request including information capable of identifying an object payer (e.g., payer ID) transmitted by the user terminal 9 (a smartphone or the like) executing an application to use the supplementary reimbursement according to the present embodiment.

Upon receiving an establishment information request from the user terminal 9 (step S501), the establishment information notifying unit 34 extracts one or a plurality of recommended establishments satisfying predetermined conditions from the payee database 22 (step S502). Here, the establishment information notifying unit 34 extracts establishments satisfying conditions such as, for example, the location of the establishment indicated by the geographical information being within a predetermined range from the workplace of the user, the establishment participating in a predetermined campaign such as a limited-time campaign during which points are imparted to a special loyalty card, and so forth, from the payee database 22 as recommended establishments. The establishment information notifying unit 34 also compares recommended establishments extracted as establishments participating in a campaign such as a limited-time campaign during which points are imparted to a special loyalty card, or the like, (campaign-participating establishment) with the visited establishment list of the object payer saved in the payer database 21, thereby extracting unvisited establishments that are recommended establishments, which this payer has not visited (step S503, for updating the visited establishment list see step S108).

The establishment information notifying unit 34 then transmits information relating to the extracted recommended establishments and unvisited establishments (name of establishment, geographical information, campaign participation information, etc.) to the user terminal 9 that is the transmission source of the request (step S504). The user terminal 9 that has received the information relating to the extracted recommended establishments and unvisited establishments displays the received information, whereby the payer can comprehend suggested establishments, campaign achievement state, and so forth (see step S108 for updating campaign achievement state). Thereafter, the processing shown in this flowchart ends.

Variations

Although various functions that can be employed to carry out the technology according to the present disclosure has been described in the above embodiment, part of the processing described above may be chosen as appropriate with the form of implementation. For example, calculation of the reimbursement amount partway through the object period (steps S105 and S106), updating usage state data, visited establishment list, and campaign achievement state (steps S107 and S108), acquisition of approval using itemized data (steps S206 and S207), recording reimbursement history (step S209), reception confirmation processing (FIG. 7), usage state inquiry processing (FIG. 8), establishment information notification processing (FIG. 10), and various functional portions for executing such processing, may be chosen as appropriate with the form of implementation.

What is claimed is:

1. An information processing device, comprising:
at least one memory configured to store computer program code; and
at least one processor configured to operate as instructed by the computer program code, the computer program code including:
acquiring code configured to cause at least one of the at least one processor to acquire, from a payment processing system, payment data relating to a completed payment, wherein the payment data comprises information that enables identifying identification of a payer, information that enables identification of a payee, and a payment amount;
identifying code configured to cause at least one of the at least one processor to identify, based on the acquired payment data, object payment data relating to a payment that is an object of reimbursement, based on the information that enables identification of the payer and the information that enables identification of the payee included in the payment data;
calculating code configured to cause at least one of the at least one processor to calculate a volume of a reimbursement value, based on the payment amount included in one or more identified object payment data, for each payer,
extracting code configured to cause at least one of the at least one processor to extract one or more of recommended establishments that satisfy predetermined conditions from a payee server for identifying the payee,
transmitting code configured to cause at least one of the at least one processor to transmit, to a terminal device, information relating to the extracted recommended establishments;
comparing code configured to cause at least one of the at least one processor to compare, based on the predetermined conditions, the one or more of the extracted recommended establishments with the payee that is identified by payment data related to the payer, and
second extracting code configured to cause at least one of the at least one processor to extract an unvisited establishment that is a recommended establishment at which the payer has not performed payment, and transmit information, to the terminal device, relating to the extracted unvisited establishment.

2. The information processing device according to claim 1, wherein the computer program code further includes:
reimbursement code configured to cause at least one of the at least one processor to reimburse, by transmitting the calculated volume of the reimbursement value for the payer to a receiving account of the payer, based on the identified object payment data.

3. The information processing device according to claim 2, wherein the transmitting code is configured to cause at least one of the at least one processor to:
transmit, through a reception operation performed by a the payer of the receiving account, the volume of reimbursement value of a type added to a balance in an account of the payer, to the receiving account.

4. The information processing device according to claim 3, wherein the transmitting code is configured to cause at least one of the at least one processor to:
transmit, through a reception operation performed by a the payer of the receiving account, the volume of reimbursement value of a type added to a balance in the account of the payer, to the receiving account.

5. The information processing device according to claim 3, wherein the computer program code further includes:
recording code configured to cause at least one of the at least one processor to record reimbursement history of the calculated volume of the reimbursement value;
determining code configured to cause at least one of the at least one processor to determine that the transmitted volume of the reimbursement value has been added to the balance in the account of the payer, by receiving a confirmation that the reception operation has been performed by the payer of the receiving account; and
updating code configured to cause at least one of the at least one processor to update a reception state of the transmitted reimbursement value based on data acquired.

6. The information processing device according to claim 2, the computer program code further including:
acquiring code configured to cause at least one of the at least one processor to acquire approval of an administrator regarding itemized data, including the amount of the reimbursement value calculated by the processor regarding a predetermined object period, output for each payer or for each group with which the payer is affiliated,
wherein the reimbursement regarding the payer or the group is carried out in a case of the approval being acquired.

7. The information processing device according to claim 2,
wherein the reimbursement code is configured to cause at least one of the at least one processor to calculate the volume of the reimbursement value on the basis of the payment amount included in the object payment data, and an upper limit of the reimbursement set in advance for each payer.

8. The information processing device according to claim 7, wherein the computer program code further comprises:
limit code configured to cause at least one of the at least one processor to set a value, inputted by a proxy payer who is different from the payer, as an upper limit for the reimbursement,
wherein the receiving account is an account of the proxy payer.

9. The information processing device according to claim 8,
wherein the computer program code is further configured to cause at least one of the at least one processor to set, as the upper limit of the reimbursement, a value based on a volume of a deposited value that the payer has deposited with the proxy userpayer.

10. The information processing device according to claim 7, wherein the computer program code is further configured to cause at least one of the at least one processor to:
transmit notification data based on the calculated the volume of the reimbursement value, and the upper limit of the reimbursement set in advance for each payer, to a terminal device of the payer.

11. The information processing device according to claim 2, wherein the computer program code is further configured to cause at least one of the at least one processor to:
associate a specified account with the payer, as the receiving account.

12. The information processing device according to claim 11,
wherein the payment data further includes information that enables identification of payment means of the payer,
wherein the payment means is a payment account to which a value for payment can be added to a balance by a prepaid system,
and wherein the computer program code is further configured to cause at least one of the at least one processor to associate the payment account with the payer as the receiving account.

13. The information processing device according to claim 1,
wherein, in a case in which a payer identified on the basis of information included in the payment data is determined to be affiliated with a predetermined group, and a payee identified on the basis of information included in the payment data is determined to be a predetermined payee, the processor identifies the payment data to be the object payment data.

14. The information processing device according to claim 1, wherein the computer program code further includes:
accumulating code configured to cause at least one of the at least one processor to accumulate the object payment data,
wherein the processor calculates a volume of the reimbursement value with regard to the object payment data within a predetermined period read as instructed by the accumulating code.

15. An information processing method, the method performed by at least one processor and comprising:
acquiring, from a payment processing system, payment data relating to a completed payment, wherein the payment data comprises information that enables identification of a payer, information that enables identification of a payee, and a payment amount;
identifying, based on the acquired payment data, object payment data relating to a payment that is an object of reimbursement, based on the information that enables identification of the payer and the information that enables identification of the payee included in the payment data;

calculating a volume of a reimbursement value used for the reimbursement, based on the payment amount included in one or more identified object payment data, for each payer, extracting one or more of recommended establishments that satisfy predetermined conditions from a payee server for identifying the payee, transmitting, to a terminal device, information relating to the extracted recommended establishments; comparing code configured to cause at least one of the at least one processor to compare, based on the predetermined conditions, the one or more of the extracted recommended establishments with the payee that is identified by payment data related to the payer, and extracting an unvisited establishment that is a recommended establishment at which the payer has not performed payment, and transmit information, to the terminal device, relating to the extracted unvisited establishment.

16. A non-transitory computer-readable recording medium having recorded thereon instructions executable by at least one processor that when executed cause the at least one processor to:

acquire, from a payment processing system, payment data relating to a completed payment, wherein the payment data comprises information that enables identification of a payer, information that enables identification of a payee, and a payment amount;

identify, based on the acquired payment data, object payment data relating to a payment that is an object of reimbursement, based on the information that enables identification of the payer and the information that enables identification of the payee included in the payment data;

calculate a volume of a reimbursement value used for the reimbursement, based on the payment amount included in one or more identified object payment data, for each payer, extract one or more of recommended establishments that satisfy predetermined conditions from a payee server for identifying the payee, transmit, to a terminal device, information relating to the extracted recommended establishments; comparing code configured to cause at least one of the at least one processor to compare, based on the predetermined conditions, the one or more of the extracted recommended establishments with the payee that is identified by payment data related to the payer, and extract an unvisited establishment that is a recommended establishment at which the payer has not performed payment, and transmit information, to the terminal device, relating to the extracted unvisited establishment.

* * * * *